No. 748,196. PATENTED DEC. 29, 1903.
L. J. J. B. LE ROND.
ROTARY ENGINE.
APPLICATION FILED JUNE 13, 1902.
NO MODEL. 7 SHEETS—SHEET 1.

WITNESSES: INVENTOR
Louis J. J. B. Le Rond.
BY
Philip Mauro.
ATTORNEY

No. 748,196. PATENTED DEC. 29, 1903.
L. J. J. B. LE ROND.
ROTARY ENGINE.
APPLICATION FILED JUNE 13, 1902.
NO MODEL. 7 SHEETS—SHEET 2.

WITNESSES
INVENTOR
BY
ATTORNEY.

No. 748,196. PATENTED DEC. 29, 1903.
L. J. J. B. LE ROND.
ROTARY ENGINE.
APPLICATION FILED JUNE 13, 1902.
NO MODEL. 7 SHEETS—SHEET 3.

WITNESSES: INVENTOR
Louis J. J. B. LeRond,
BY
Philip Mauro,
ATTORNEY

No. 748,196. PATENTED DEC. 29, 1903.
L. J. J. B. LE ROND.
ROTARY ENGINE.
APPLICATION FILED JUNE 13, 1902.
NO MODEL. 7 SHEETS—SHEET 6.

WITNESSES: INVENTOR
Louis J. J. B. Le Rond,
BY
Philipp Mauro,
ATTORNEY

No. 748,196. PATENTED DEC. 29, 1903.
L. J. J. B. LE ROND.
ROTARY ENGINE.
APPLICATION FILED JUNE 13, 1902.
NO MODEL. 7 SHEETS—SHEET 7.

WITNESSES INVENTOR
Louis J. J. B. Le Rond,
BY
ATTORNEY

No. 748,196. Patented December 29, 1903.

UNITED STATES PATENT OFFICE.

LOUIS JULES JEAN-BAPTISTE LE ROND, OF PARIS, FRANCE.

ROTARY ENGINE.

SPECIFICATION forming part of Letters Patent No. 748,196, dated December 29, 1903.

Application filed June 13, 1902. Serial No. 111,538. (No model.)

*To all whom it may concern:*

Be it known that I, LOUIS JULES JEAN-BAPTISTE LE ROND, a citizen of the Republic of France, residing at Paris, in the Republic of France, have invented a new and useful Improvement in or Relating to Rotary Engines or Pumps, which invention is fully set forth in the following specification.

The present invention relates to that class of rotary engines or pumps described in my prior patent, No. 646,151, of March 27, 1900, the motor being so constructed that it can be reversed, while several other advantages are also obtained by the new construction.

Supposing that in a rotary engine of my system having chambers divided into several working compartments two of these chambers are arranged one next to the other, the motive fluid in the compartments of one chamber being under high pressure while the compartments of the other chamber are under low pressure, it will be easily understood that by combining the openings of the high-pressure compartments with the adjacent low-pressure compartments in different ways it will be possible to reverse the direction of rotation. A suitable arrangement for carrying out the different combinations being provided, the engine will rotate in one direction or the other, according as the motive fluid passes from the high-pressure compartment to one or the other of two low-pressure compartments with which it may be put into communication.

In the accompanying drawings.

Figure 1:
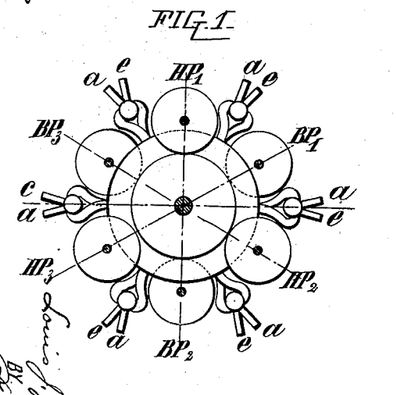
Figures 1, 2, and 3 illustrate in a general manner the new arrangement serving for reversing the engine.
Figure 2:
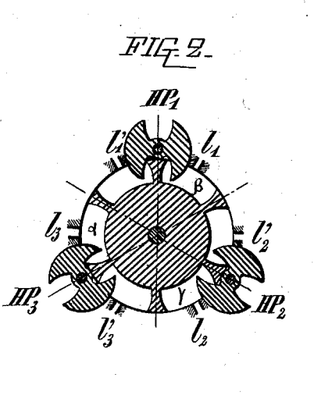
Figure 3:
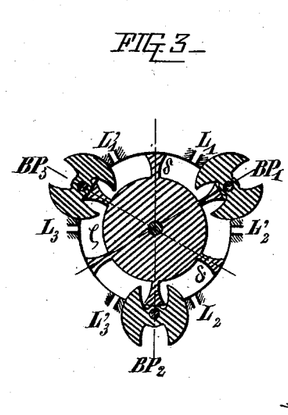

The invention will now be described with reference to Figs. 1, 2, and 3, 11, 12, 13, and 14. Fig. 2 represents in section the high-pressure chamber, and Fig. 3 the low-pressure chamber, the short closing cylinders or obturators of the one chamber having intermediate positions with regard to the closing cylinders of the other chamber, as shown in Fig. 1. The openings of the high-pressure and low-pressure chambers communicate with one another, the port $l$ being connected with $L_1$ by the channel $i_1$ $I_1$, $l_2$ with $L_2$ by channel $i_2$ $I_2$, $l_3$ with $L_3$ by a similar channel, (not shown,) $l'_1$ with $L'_1$ by $i'_1$ $I'$, $l'_2$ with $L'_2$ by $i'_2$ $I_2$, and $l'_3$ with $L'_3$ by a similar channel. (Not shown.) Ports $l$ can, moreover, be brought into connection with the admission-conduits $a$ and ports L with the exhaust-conduits $e$. Suitable valves, cocks, or other similar devices being provided in these channels various combinations may be obtained. For instance, by means of the rotary valves $R_1$ $R'_1$ $R_2$ $R'_2$ one can put in communication either (1) $l'$ $l_2$ $l_3$ with their admission openings; (2) $l'_1$ $l'_2$ $l'_3$, respectively, with $L'_1$ $L'_2$ $L_3'$; (3) $L'$ $L_2$ $L_3$ with the exhaust-conduits $e$. In this case, which is shown in Figs. 5, 11, 12, and 14, the engine will turn in clockwise direction. If, however, the following connections are made by the shifting of lever P to P', (1) $l'_1$ $l'_2$ $l'_3$ with the admission; (2) $l'$ $l_2$ $l_3$ with $L'$ $L_2$ $L_3$, respectively; (3) $L'_1$ $L'_2$ $L'_3$ with the exhaust, the engine will turn in the opposite direction—*i. e.*, in counter-clockwise direction. It will be easily understood that the change of direction is obtained by causing each high-pressure compartment to work with one or the other of the two adjacent low-pressure compartments—viz., $\alpha$ (HP) with $\sigma$ or $\delta$ (BP), $\beta$ (HP) with $\varepsilon$ or $\varsigma$ (BP), $\gamma$ (HP) with $\delta$ or $\varepsilon$ (BP).

It is understood that the described mode of altering the direction may be applied to any rotary engine comprising high-pressure and low-pressure compartments.

Figure 4:
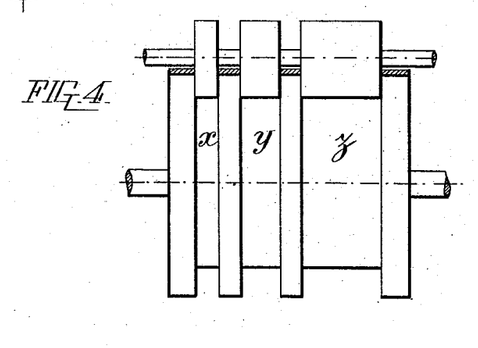
Figs. 4, 5, and 6 show the arrangement in the case of the closing or abutment cylinders of the engine being arranged on common shafts.
Figure 5:
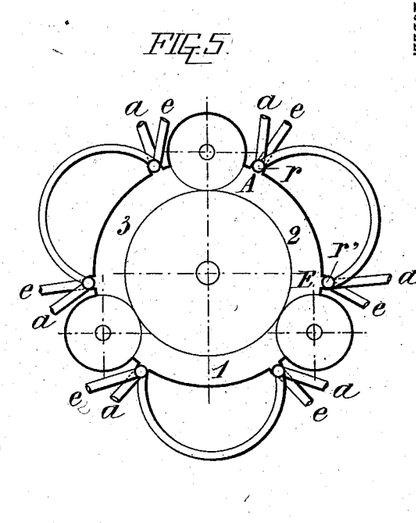
Figure 6:
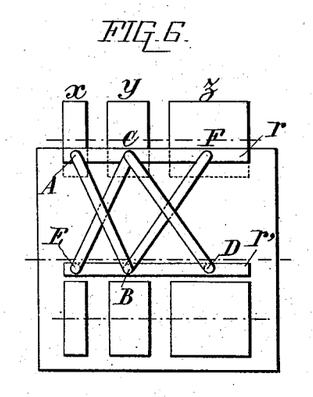
Figure 7:
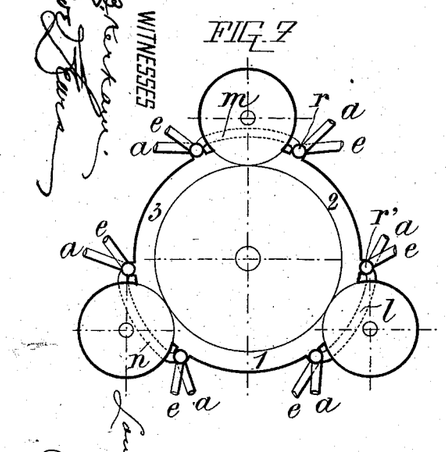
Fig. 7 is a modification of this arrangement.
Figures 15, 16, 17:
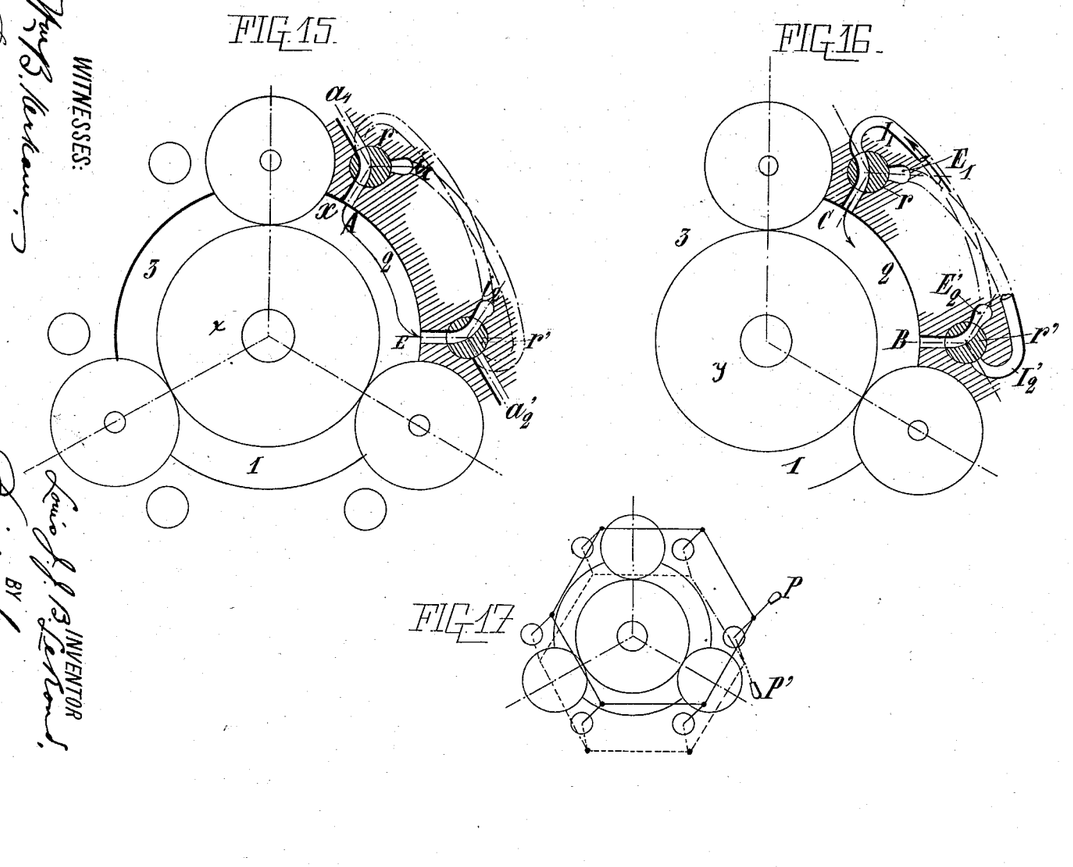
Figs. 15, 16, and 17 show the arrangement of ports, conduits, valves, and valve-operating mechanism shown in Figs. 4, 5, and 6.

The change of direction can be obtained in a very simple manner also in cases where the closing cylinders corresponding to the same section of action of the engine are mounted on the same shaft. This arrangement is illustrated in Figs. 4, 5, and 6, showing, for example, an engine with three sections in triple expansion. The three sections are represented by 1 2 3. The expansion takes place successively in the three divisions $x\ y\ z$. Considering, for instance, section 2, Figs. 5, 6, 15, and 16, the steam enters through admission-conduit $a$, valve $r$, and port A and escapes from the high-pressure compartment through the port E, valve $r'$, and conduit $i_2$, then enters the medium-pressure division $y$ through the port C, escapes at B, passing through valve $r'$, and passes by conduit $E'_2$ to the low-pressure division $z$, entering the same through the inlet-opening F, and finally escapes through exhaust-opening D. Under these conditions the engine rotates in the clockwise direction. If, however, the steam is admitted to the high-pressure compartment by a pipe $a'_2$ through valve $r'$ and port E, it escapes through A, valve $r$, passing through conduit $i'_1$, Figs. 6 and 16, and port B into the middle-pressure compartment $y$, from which it escapes at C through valve $r$ to pass through conduit $I'_2$ into the low-pressure compartment $z$, from which it escapes finally at F. If, for example, the pipes admitting live steam are connected to A and E, while exhaust-pipes lead from F and D, it will be sufficient to have valves, cocks, or slides, such as $r\ r'$, arranged to cause the steam to travel in the one or the other of the above-indicated ways by the shifting of lever P into position $P'$, Fig. 17. It is clear that this arrangement is only a modification of that previously described with reference to Figs. 1, 2, and 3.

Figure 18:
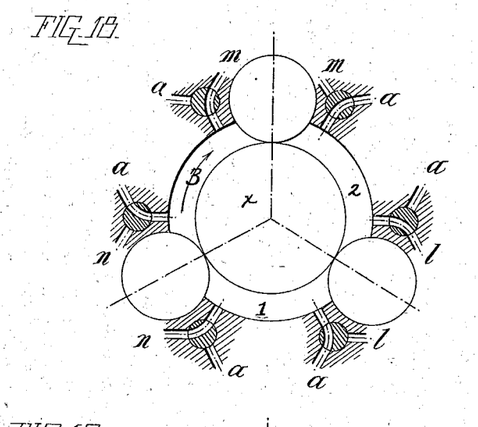
Figs. 18 and 19 show the arrangement of ports, valves, and conduits for the structure of Fig. 7.
Figure 19:
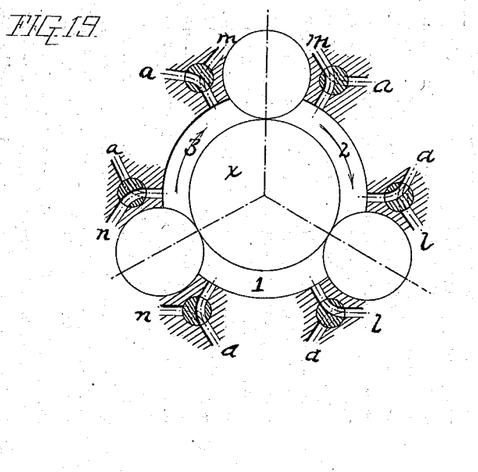
Figure 20:
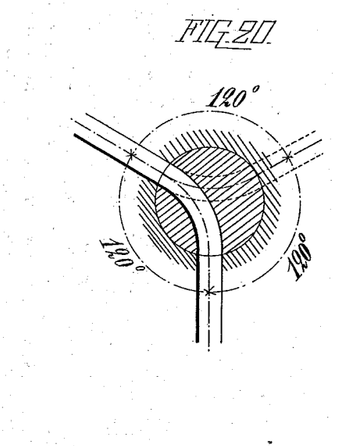
Fig. 20 is a detail of one of the valves.

The different steam-conduits could be also arranged as shown in Figs. 18 and 19 at $l\ m\ n$. In this modification when the engine is to turn in the clockwise direction, Fig. 18, the steam admitted to compartment 1 of division $x$ passes through conduit $n$ into compartment 3 of division $y$, from which it escapes through conduit $m$ into compartment 2 of division $z$, from which it escapes into the exhaust. To obtain rotation in the opposite direction, Fig. 19, the steam admitted to compartment 1 of division $x$ would have to pass through $l$ into compartment 2 of division $y$ and then through $m$ into compartment 3 of division $z$, from which it escapes. It will be seen that the change of direction can in this case be obtained by means of the same valves $r$ and $r'$.

Figure 8:
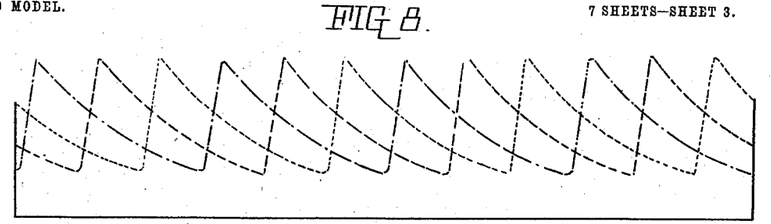
Figs. 8, 9, and 10 represent a complementary arrangement by which the engine constitutes a polyphase motor in order to be readily started in either direction by the mere shifting of the valve.
Figure 9:
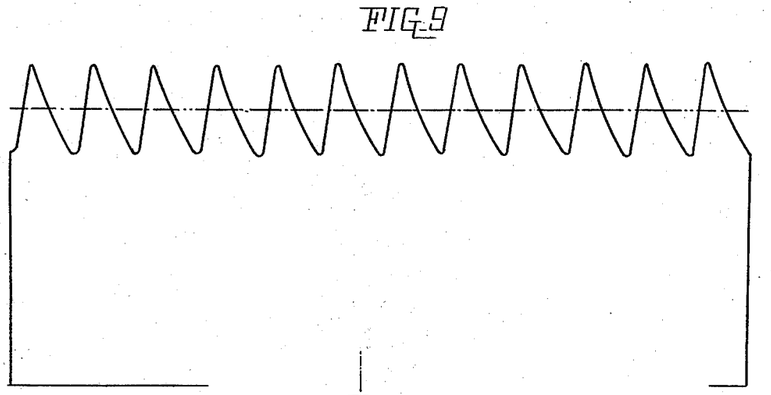

In the above-described arrangements reversal in the direction of feed or passage of the motive fluid is effected by the valves, which may be of any suitable type; but to most effectively reverse the motor it will not suffice to simply reverse the direction of the passage of the motive fluid with the parts in such relative position as might theoretically serve to reverse the motor. It is necessary or desirable that the motor be able to start itself whatever the position of its parts, as well as to reverse its motion by simply shifting the position of the valves and without the assistance of extraneous means or power. This can only be realized by securing a constantly-applied driving power in all of the angular positions of the motor-axle. In a non-reversible engine the movement is regulated by a fly-wheel; but in a reversible engine to obtain a regular movement the driving power must be applied as constantly as possible. To obtain this regular movement, a motor such as herein set forth is made to operate in the following manner: The improved engine can be converted into a polyphase motor by means of a special arrangement. The term "polyphase motor" is taken from the electric polyphase motors and is intended to indicate that the action in the different compartments arranged about the same shaft begins at different times. Thus in the polyphase rotary engine the corresponding phases for one revolution will in the various compartments begin under different angular positions of the motor-shaft, and the angles between those initial working positions of each compartment constitutes what is called the "phase" angle in electric motors. In comparison with electric motors a complete working period in one compartment or group of compartments, comprising admission, expansion, or compression and exhaust, will constitute a "period." Fig. 8 shows for one revolution the diagrams of work of a polyphase motor having triple expansion, with four periods per revolution in each chamber, in their relative positions. As may be seen from Fig. 8, the working diagram of each chamber is composed of four periods, which for each chamber are indicated by different kinds of dotted lines. An engine working according to the diagram shown would be a rotary three-phase engine, the resulting diagram being represented by Fig. 9. The advantages obtainable by the improved polyphase rotary engine will be easily understood from Figs. 8 and 9: first, there is no deadpoint; second, the engine can run readily either forward or backward; third, in the motors the torsional moment is as constant as in a polyphase dynamo, which are now considered as best adapted for the transmission of energy. Experiments made with the improved rotary engines have shown the average torsional moment of an ordinary engine of the type in question to be equal to .560 of the maximum moment, while a three-phase engine of the same type had an average moment equaling 0.873 of the maximum moment. The reversing of motion is therefore practically instantaneous. Fourth, the torsional moment being only to a small degree variable there is no need to provide a special mass to maintain the movement, and therefore the weight of the motor may be reduced to a minimum, which renders the improved system particularly applicable for every kind of automobile vehicle and for the propulsion of aerostats.

Figure 10:
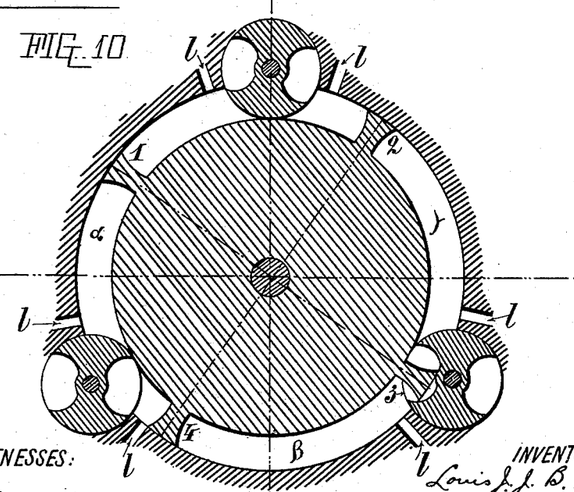
Figures 11, 12:
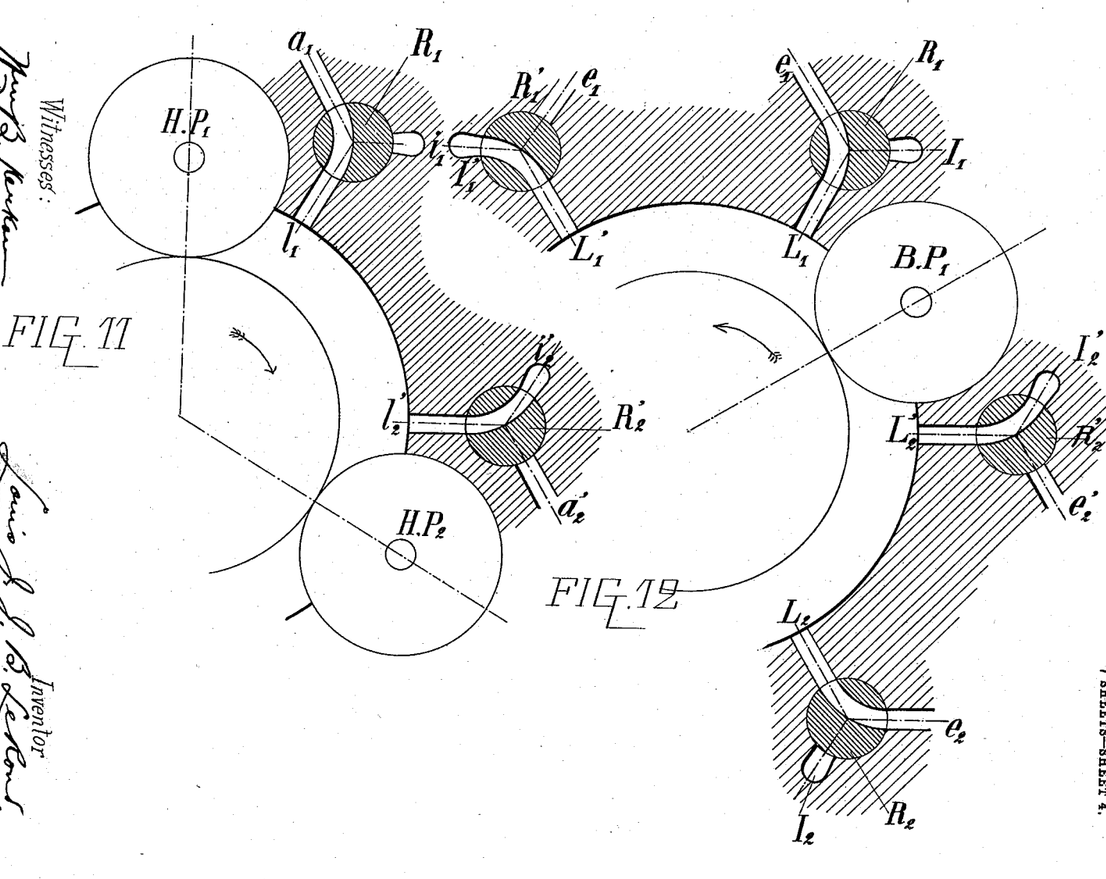
Figs. 11 and 12 are sectional views showing the ports, valves, and conduits of the high and low pressure cylinders, respectively, of Figs. 1, 2, and 3.
Figure 13:
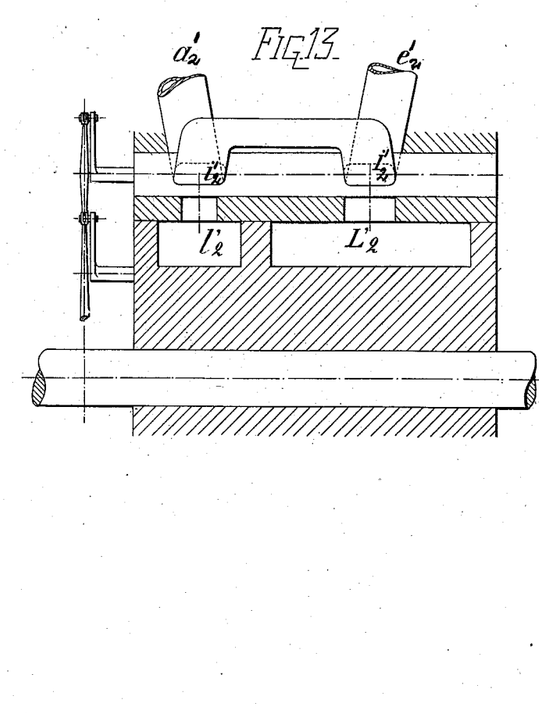
Fig. 13 is a sectional view in line with the axis of rotation of the motor.
Figure 14:
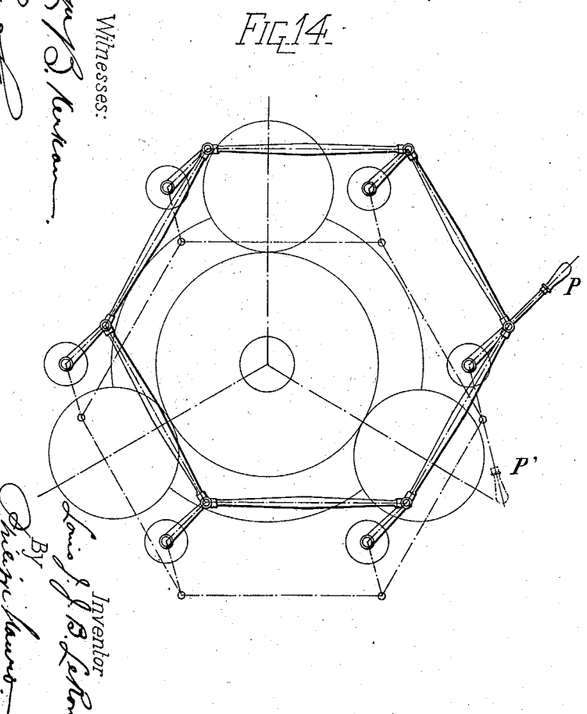
Fig. 14 shows the valve-operating mechanism.

Having now defined the nature of the improvement which I term "polyphase" rotary engine, the conditions observed for obtaining the advantages mentioned are as follows: The rotary engine may be of any desired kind, with one or more shafts, and may be actuated by gas, steam, fluid, combustible powder, or the like and may be used either as a motor or as a pump or as a combined motor and pump. The only condition which must be observed is that the total number of the compartments and the number of periods of action in each compartment during one revolution must not have one of them for the greatest common measure or divisor. For instance, supposing a rotary motor comprising three working compartments and four pistons or vanes, it will be seen that of the two numbers "3" and "4," none being the greatest common divisor of the other, the working periods in each compartment do not coincide, but vary with regard to one another. The four pistons acting successively in each of the three compartments, four working periods will take place in each compartment during one revolution, each period corresponding to an angle of ninety degrees. The piston, Fig. 10, however, begins to act in the compartments β and γ only after the shaft has turned one hundred and twenty degrees and two hundred and forty degrees from the position in which the piston had begun to work in the compartment α. The working diagrams of the compartments β and γ are therefore "shifted" relatively to the working diagram of compartment α to the extent of one hundred and twenty degrees and two hundred and forty degrees, respectively. There will be therefore three series, each consisting of four periods and shifted one relatively to the other by one hundred and twenty degrees—i. e., twelve periods spaced with regard to each other to the extent of one-twelfth of one revolution—i. e., thirty degrees. This example is represented by Figs. 1 and 2. In the examples cited, "3" and "4" are prime numbers, and all periods of the different compartments are shifted relatively to each other. In case the two numbers were "6" and "8" the greatest common divisor would be "2." The engine would have eighty-four periods; but as the parts consisting of three compartments or four pistons are equal to one another and to one-half the circumference the phases in two compartments diametrically opposite will be the same. The forty-eight periods will therefore coincide in pairs, whereby the angle of phase is reduced to one twenty-fourth of the periphery—i. e., fifteen degrees. The motor is therefore both balanced and polyphased. Generally speaking, if G be the number of the compartments and P the number of working periods in each compartment during one revolution, the total number of periods in one revolution will be G times P. If now D be the greatest common divisor of G and P, the number of different periods during one revolution of the resulting diagram representing the total work in the compartments will be G times P divided by D. The number D defines the balance of the machine and indicates that the same phase occurs at such points of the periphery which correspond with the corners of a regular polygon, the number of sides of which is D. In the foregoing description the compartments were supposed to be equal and the pistons arranged at equal distances apart. It is obvious, however, that compartments of different lengths and arranged irregularly round the periphery, as well as irregularly-arranged pistons, could be used without departing from the spirit of the invention.

What is claimed is—

1. In a rotary engine, in combination, a casing; a plurality of chambers in said casing, a revoluble shaft passing through each chamber; pistons located on said shaft; abutments located at suitable angular distances about the casing and provided with grooves engaging said pistons, thereby dividing each chamber into compartments, the number of said compartments and pistons in each chamber having no common divisor equal to either number; inlet and outlet ports for each compartment, conduits for connecting the several compartments of one chamber with those of another chamber, and reversing-valve mechanism for reversing the order of admission and exhaust.

2. In a rotary engine, in combination, a casing; a plurality of chambers in said casing, constituting high and low pressure chambers; a revoluble shaft passing through each chamber; pistons located on said shaft; abutments located at suitable angular distances about the casing and provided with grooves engaging said pistons, thereby dividing each chamber into compartments, the abutments of one chamber being angularly displaced with respect to those of the next; inlet and outlet ports for each compartment; conduits for connecting the high-pressure compartments of one chamber with the low-pressure compartments of the next chamber and reversing-valve mechanism for reversing the order of admission and exhaust.

3. In a rotary engine, in combination, a casing forming a chamber; a shaft passing therethrough; pistons located on said shaft; abutments located at suitable angular distances about the casing and provided with grooves engaging said pistons, thereby dividing the chamber into compartments, the number of said compartments and pistons having no common divisor equal to either number; inlet and outlet ports for each compartment; and reversing-valve mechanism for reversing the order of admission and exhaust.

4. In a rotary engine or analogous apparatus, a high-pressure chamber and a low-pressure chamber each divided into a plurality of compartments by rotatable abutments, a series of pistons rotating in each of said chambers the pistons of each chamber being fixed to a common axle, the number of said compartments and pistons in each chamber having no common divisor equal to either number, two ports leading into each compartment of the high-pressure chamber, a valve or like means adapted according to its position to connect each port either to a supply-conduit or to an exhaust-conduit leading to the low-pressure chamber, two ports leading into each compartment of the low-pressure chamber, and a valve or like means adapted according to its position to connect each of said last-mentioned parts either to one of the conduits leading from the high-pressure chamber or to an exhaust passage or opening.

In testimony whereof I have signed this specification in the presence of two subscribing witnesses.

LOUIS JULES JEAN-BAPTISTE LE ROND.

Witnesses:
EMILE LEDRET,
EDWARD P. MACLEAN.